United States Patent
Wu et al.

(10) Patent No.: US 11,995,899 B2
(45) Date of Patent: May 28, 2024

(54) POINTER-BASED CONTENT RECOGNITION USING A HEAD-MOUNTED DEVICE

(71) Applicant: Google LLC, Mountain View, CA (US)

(72) Inventors: Qinge Wu, Fremont, CA (US); Grant Yoshida, Sunnyvale, CA (US); Catherine Boulanger, Palo Alto, CA (US); Erik Hubert Dolly Goossens, San Francisco, CA (US); Cem Keskin, San Francisco, CA (US); Sofien Bouaziz, Los Gatos, CA (US); Jonathan James Taylor, San Francisco, CA (US); Nidhi Rathi, San Francisco, CA (US); Seth Raphael, Portland, OR (US)

(73) Assignee: Google LLC, Mountain View, CA (US)

( * ) Notice: Subject to any disclaimer, the term of this patent is extended or adjusted under 35 U.S.C. 154(b) by 477 days.

(21) Appl. No.: 17/302,291

(22) Filed: Apr. 29, 2021

(65) Prior Publication Data
US 2022/0350997 A1 Nov. 3, 2022

(51) Int. Cl.
*G06V 20/62* (2022.01)
*G02B 27/00* (2006.01)
(Continued)

(52) U.S. Cl.
CPC ......... *G06V 20/63* (2022.01); *G02B 27/0093* (2013.01); *G02B 27/017* (2013.01);
(Continued)

(58) Field of Classification Search
CPC .. G06V 20/63; G06V 10/255; G02B 27/0093; G02B 27/017
See application file for complete search history.

(56) References Cited

U.S. PATENT DOCUMENTS

| | | | |
|---|---|---|---|
| 2014/0361988 A1* | 12/2014 | Katz | G06T 7/70 345/156 |
| 2016/0098611 A1* | 4/2016 | Gray | G06V 30/1452 382/229 |

(Continued)

OTHER PUBLICATIONS

Guo, et al., "Vizlens: A Robust and Interactive Screen Reader for Interfaces in the Real World", UIST, https://www.cs.cmu.edu/~jbigham/pubs/pdfs/2016/vizlens.pdf, Oct. 16-19, 2016, 14 pages.

(Continued)

*Primary Examiner* — David Perlman
(74) *Attorney, Agent, or Firm* — Brake Hughes Bellermann LLP

(57) ABSTRACT

A head-mounted device (HMD) can be configured to determine a request for recognizing at least one content item included within content framed within a display of the HMD. The HMD can be configured to initiate a head-tracking process that maintains a coordinate system with respect to the content, and a pointer-tracking process that tracks a pointer that is visible together with the content within the display. The HMD can be configured to capture a first image of the content and a second image of the content, the second image including the pointer. The HMD can be configured to map a location of the pointer within the second image to a corresponding image location within the first image, using the coordinate system, and provide the at least one content item from the corresponding image location.

17 Claims, 9 Drawing Sheets

(51) Int. Cl.
   *G02B 27/01*   (2006.01)
   *G06V 10/20*   (2022.01)
   *G06V 30/10*   (2022.01)
(52) U.S. Cl.
   CPC .... *G06V 10/255* (2022.01); *G02B 2027/0138* (2013.01); *G02B 2027/014* (2013.01); *G06V 30/10* (2022.01)

(56) References Cited

U.S. PATENT DOCUMENTS

| | | | | |
|---|---|---|---|---|
| 2017/0111584 | A1* | 4/2017 | Hong | G06T 7/246 |
| 2019/0369717 | A1* | 12/2019 | Frielinghaus | G06F 3/011 |
| 2021/0224532 | A1* | 7/2021 | Bellert | G06F 40/106 |

OTHER PUBLICATIONS

Holton, "Myreader and Myeye Fromo Orcam: Text and Item Recognition at the Touch of a Finger", American Foundation for the Blind, https://www.afb.org/aw/18/2/15244, Feb. 2017, 7 pages.
Murphy, "Orcam Launches Companion App for Myeye2", Masterclassing Awards, Mar. 21, 2019, 8 pages.

* cited by examiner

POINTER-BASED CONTENT RECOGNITION USING A HEAD-MOUNTED DEVICE

TECHNICAL FIELD

This description relates to content access using a head-mounted device.

BACKGROUND

Many techniques exist for recognizing and otherwise accessing content, such as printed or displayed text. For example, optical character recognition (OCR) enables conversion of an image of text (e.g., from a photograph or scanned document) into editable text. As another example, text-to-speech (TTS) enables generation of audible, spoken versions of text.

SUMMARY

In a general aspect, a head-mounted device (HMD) can be configured to determine a request for recognizing at least one content item included within content framed within a display of the HMD. The HMD can be configured to initiate, in response to the request, a head-tracking process that maintains a coordinate system with respect to the content, and initiate, in response to the request, a pointer-tracking process that tracks a pointer that is visible together with the content within the display. The HMD can be configured to capture a first image of the content, and capture a second image of the content, the second image including the pointer. The HMD can be configured to map a location of the pointer within the second image to a corresponding image location within the first image, using the coordinate system, and provide the at least one content item from the corresponding image location.

The details of one or more implementations are set forth in the accompanying drawings and the description below. Other features will be apparent from the description and drawings, and from the claims.

DETAILED DESCRIPTION

Figure 1:
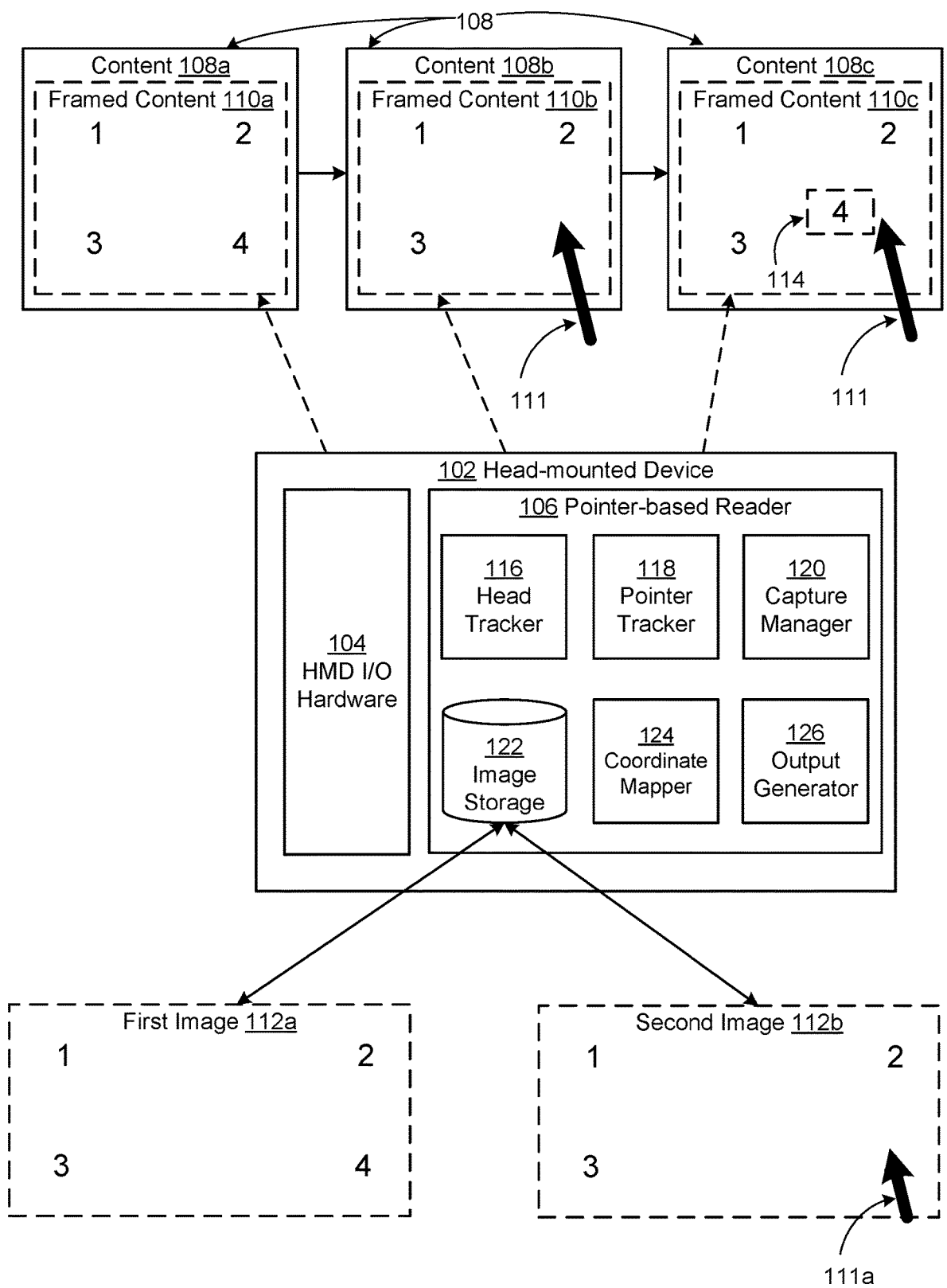
FIG. 1 is a block diagram of a system for pointer-based content recognition using a head-mounted device.

Described systems and techniques enable real-time interaction between a user and visible content, such as written text, using a head-mounted device (HMD) worn by the user. During example operations, an image of content is captured using the HMD. While the user views the content using the HMD, head movement tracking with respect to the content is performed in parallel with pointer tracking, where the pointer may include a finger of the user. As the user continues to view the content using the HMD, the user is able to identify, e.g., point to, a specific content item and thereby cause the HMD or other output device to provide the content to the user, or otherwise use or access the content.

For example, to identify a content item, such as a word or number, the user may point their finger at the content item. Even if the user's finger partially or completely covers or occludes the content item, the described system is capable of providing an audible reading or other output or use of the content item.

Any user who prefers or requires assistance in interacting with content viewable with the HMD may benefit from described techniques. For example, as described below, users may wish to have translations of written content provided, or may wish to have functionalities of a device explained or executed. In particular examples, users with autism, dyslexia (or other reading challenges), or blind or low vision (BLV) users, may use described techniques to interact with written content, physical objects, or interactive devices, in manners that are not currently available.

For example, some currently-available, conventional techniques may provide a reading of text that is identified by a pointing action of a user. However, such techniques typically provide a simple read-out of text in a vicinity of a finger or other pointing implement, following a pointing action. If the user wishes to have a further read-out performed, then the user must repeat the entire process for a new section of text, which may be overlapping with (e.g., repetitive of, or redundant to) the previously-read text. As a result, the process is imprecise, time-consuming, and generally cumbersome to the user.

In other words, in such systems, neither the system nor the user has knowledge of the content prior to, or independently of, the pointing action, and/or in sufficient detail to enable the types of interactions described herein. Instead, it is the pointing action that is used to identify the content for which knowledge is desired, and knowledge of the actual content is obtained in response to the pointing action.

Even if prior knowledge of particular content is available prior to the pointing action and associated outputs, conventional systems must rely on pre-existing sources of such prior knowledge. For example, such systems may rely on images of content that have been previously captured and annotated. Consequently, such systems are limited to use with such content, may suffer from high latencies, and are not capable of the types of real-time interactions described herein.

HMDs provide many benefits, such as enabling image capture within a natural field of view of a user. However, operations of HMDs may be constrained by available power (e.g., battery) levels, as well as processing limitations that may lead to unacceptable latencies in providing desired results. Such constraints may make some HMD operations infeasible or impractical. For example, in conventional uses, operations such as optical character recognition (OCR) may either consume excessive battery power, and/or may be associated with excessive latency.

Described techniques enable, for example, practical use of HMDs to capture an image of content, perform OCR on the content to obtain recognized content, perform head-tracking with respect to the content, perform pointer-tracking with respect to the content, and relate the tracked pointer to the tracked and recognized content. Consequently, while the overlapping tracking operations of head tracking and pointer tracking are continuously and concurrently performed with respect to the content, a user may have multiple, ongoing interactions with the content, in a manner that is low latency and low power. For example, described techniques may require minimal (e.g., only once per interaction) occurrence of image capture and OCR of the content.

FIG. 1 is a block diagram of a system for pointer-based content recognition using a head-mounted device (HMD) 102. In FIG. 1, as described in detail below, the HMD 102 utilizes various types of input/output (I/O) hardware 104 to implement a pointer-based reader 106. The pointer-based reader 106 may be configured to provide a user of the HMD 102 with access to content 108 in a fast, responsive, intuitive, and accurate manner.

The HMD 102, as described and illustrated below, may include any hardware (including the illustrated I/O hardware 104, and any associated software) that may be worn on a head of a user and that leverages or utilizes its position on the user's head, and/or that relies on or augments user abilities (e.g., sight, hearing, or head position/orientation) to provide functionality to the user. In some implementations, functionality of the HMD 102 may alternatively or additionally be provided using other, different types of wearable devices, such as watches, rings, or clothing.

For example, the HMD 102 may include or represent glasses, augmented reality glasses, goggles, a hat, helmet, headband, or other headwear, including conventional headwear retrofitted with suitable hardware/software. An example embodiment in which the HMD 102 is implemented using glasses is illustrated and described in more detail, below, with respect to FIG. 7. The I/O hardware 104 may include or represent, e.g., multiple types of, e.g., image, audio, or haptic I/O elements, as well as various types of wireless or network connection transceivers.

The pointer-based reader 106 may be configured to provide desired access to, and use of, content 108. In FIG. 1, the content 108 is illustrated at a first point in time as content 108a, at a second point in time as content 108b, and at a third point in time as content 108c. More generally, it will be appreciated that the content 108 may be viewed by the user, using the HMD 102, over a period of time, so that the content 108a, 108b, 108c represent what a user sees over that period of time. As a result, as described below, a corresponding sequential plurality of images of the content 108 may be captured by the HMD 102, while the user views the content 108 using the HMD 102.

Figure 3A:
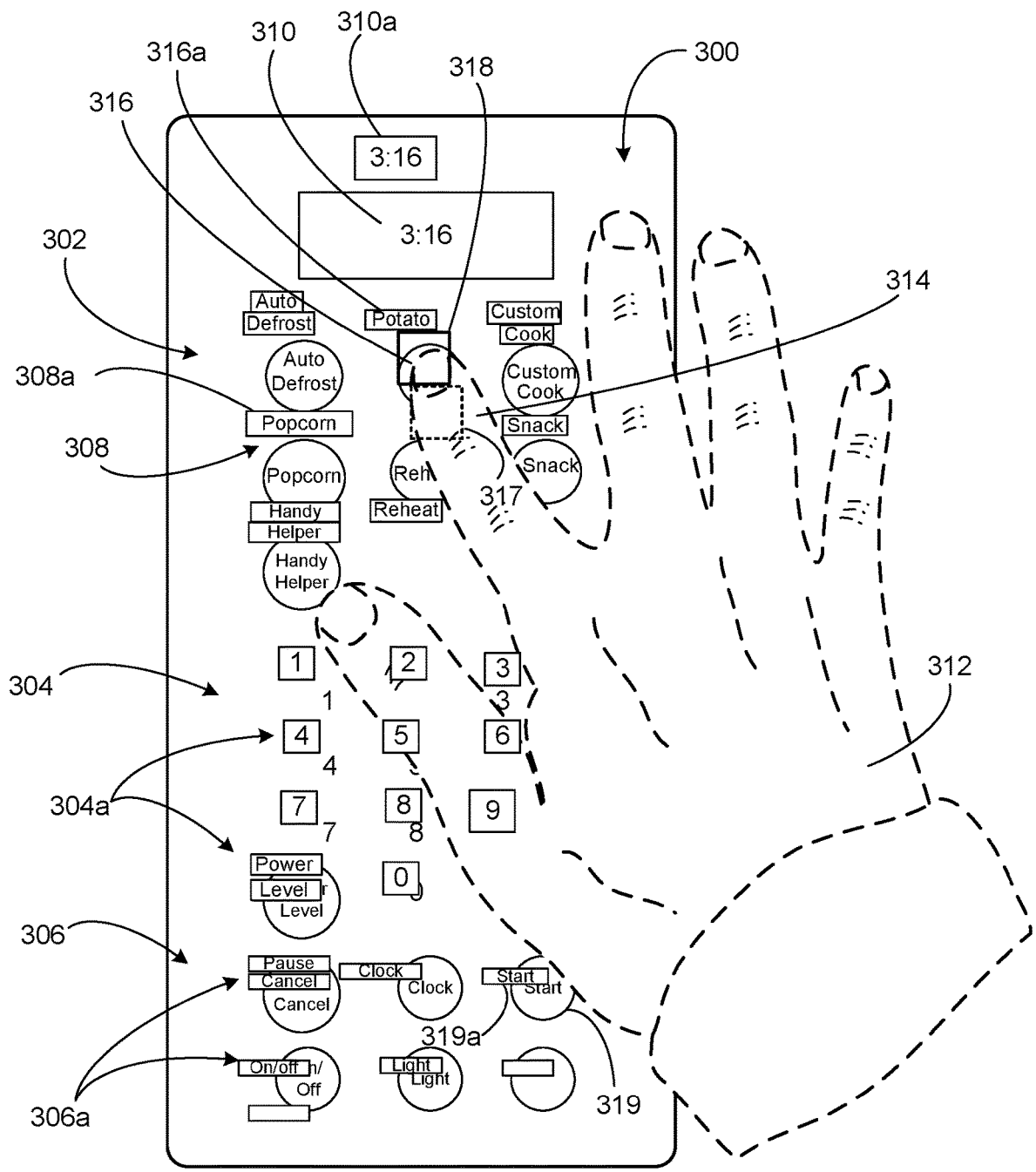
FIG. 3A illustrates an example HMD display according to example embodiments.

In the simplified example of FIG. 1, the content 108 includes individual content items as the numbers 1, 2, 3, 4. For example, as shown in FIG. 3A, the content 108 may include, or may be provided on, an interactive touchpad, such as a touchpad for controlling an appliance, such as a microwave oven. In other examples, the content 108 may represent a computer keyboard. In other examples, the content 108 may be provided as printed text, such as a paper document, or a label. More generally, the content 108 may represent virtually any content that may be detected or recognized by the HMD 102. In addition to alphanumeric symbols, the content 108 may thus include, by way of non-limiting example, images, illustrations, or graphs.

Consequently, it will be appreciated that any such content may include various types of corresponding content items. For example, in addition to individual numbers and letters, content items may include words, image elements of an image, cells of a spreadsheet, or graph elements of graphs.

The pointer-based reader 106 may be configured to recognize, categorize, or classify specific types of content items, using any suitable techniques. For example, various types of machine learning may be used to identify desired types of content items from corresponding types of content.

Further in FIG. 1, a pointer 111 represents any suitable pointing device or implement that may be used to indicate at least one specific content item of the content 108. In many of the examples provided herein, the pointer 111 may represent a finger of a user. In other implementations, any suitable pointer may be used, such as a pen or pencil, or a stylus.

Thus, in the examples of FIG. 1, it is assumed that the content 108 is sufficiently within reach of a user to enable the user to touch, reach, or otherwise point to desired content items. For example, the content 108 may be printed on an item (e.g., on an item label) that the user is holding. In another example, the content 108 may be provided on a wall or presentation surface, with the user standing nearby.

When the user includes the pointer 111 within a field of view of the HMD 102, then the framed content 110b includes at least a portion of the pointer 111, as shown. Consequently, it may occur that the pointer 111 partially or completely covers or occludes one or more content item, or otherwise identifies (e.g., points to) one or more content items. For example, in FIG. 1, the pointer 111 is illustrated as occluding the content item '4.'

As further illustrated in FIG. 1, the HMD 102 may be configured to capture framed content 110a as a first image 112a, and, at a different point in time, may capture framed content 110b as a second image 112b, where example techniques for framing the content 108 are provided below. As a result, and as shown, the second image 112b includes a pointer image 111a, and omits the occluded content item '4.'

Using the first image 112a and the second image 112, the pointer-based reader 106 may be configured to determine that a location (e.g., coordinate position) of the pointer image 111a in the second image 112b corresponds to a location (e.g., coordinate position) of the content item '4' in the first image 112a. Consequently, at the third point in time corresponding to content 108c in FIG. 1, the pointer-based reader 106 may provide output identifying the occluded, or otherwise identified, content item '4.'

In the example of FIG. 1, identification of the content item '4' includes a display of the occluded content item within a superimposed content item image 114. That is, as shown, the pointer-based reader 106 enables and causes a display of the occluded content item within a field of view of the HMD 102.

Although the superimposed content item image 114 is illustrated as a visible display, it will be appreciated that the pointer-based reader 106 may provide multiple types of readings or other outputs of, or uses of, the occluded content item '4.' For example, additionally or alternatively to the superimposed content item image 114, the pointer-based reader 106 may provide an audible reading of the occluded content item '4', using speakers or other suitable audio output of the HMD I/O hardware 104.

In example operations, then, a user may view the content 108, point to the content item '4', and thereby easily have the content item '4' read out audibly and/or displayed visibly, even while being occluded by, e.g., the user's finger. When the content 108 includes a word, or multiple words in a line of text, the user may point to specific words to have the words read out, or the user may trace the user's finger along the line of text to have the entire line of text read out.

When the content 108 includes a touchpad, keyboard, or similar interactive interfaces, the user may thus be provided with an ability to identify, and therefore effectively use, any desired element(s) of such interfaces. For example, when the content 108 is included on a computer keyboard, a user may place their finger on a key and be provided with an audible readout of that key, so that the user may make effective use of the keyboard, even if the user is a BLV user. Moreover, the user may conduct multiple successive interactions with the keyboard to select desired keys and otherwise utilize the keyboard. These advantages may be obtained across virtually any style, size, or layout of keyboard, even if the pointer-based reader 106 has not previously encountered or examined the keyboard being used.

In the example of FIG. 1, the pointer-based reader 106 is illustrated at including a head tracker 116, which is configured to track a movement of the HMD 102 relative to the content 108, so as to continuously, consistently, and accurately identify and track the individual content items of the content 108. For example, as the user moves their head, and thus the HMD 102, a field and angle of view of the HMD 102 (e.g., of a camera of the HMD hardware 104) may also change. The head tracker 116 performs tracking of a coordinate system as the user's head moves relative to the content 108, and is therefore able to track, for example, that a particular content item is the same content item as such movement occurs.

Without tracking operations of the head tracker 116, the pointer-based reader 106 may lose accuracy, suffer reduced latency, and/or suffer increased battery drain. For example, without such head-tracking operations, the pointer-based reader 106 may fail to distinguish between two similar or same content items, or may be required to repeatedly recalibrate in order to minimize or avoid such errors (thereby leading to increased latency and battery usage).

In some implementations, described below, the head tracker 116 may implement template tracking, in which an initial image of the content 108, such as, or similar to, the first image 112a, is used as a template. Then, subsequent content images may be tracked with respect to the template image. However, other head tracking techniques may be used, as well.

A pointer tracker 118 is used to track the pointer 111, e.g., a finger of the user. Again, multiple pointer tracking techniques may be used. For example, machine learning classification techniques may be used to identify a hand (and individual fingers) of a user. In other examples, detectable elements of the pointer 111 may be tracked, such as when the pointer 111 represents a finger and the pointer tracker 118 tracks a fingernail of the finger being used. In other examples, a detectable element may be attached to the user's finger, or to a stylus or other pointing element, to enable pointer (e.g., finger) tracking.

A capture manager 120 represents one or more components configured to capture images of the content 108, including the images 112a, 112b, using a camera of the HMD I/O hardware 104. Capturing may be performed based on an explicit command from a user, or may be performed automatically in response to a detected event, such as a specific framing of the content 108.

The capture manager 120 may be further configured to perform text detection and OCR when the content 108 includes written text. More generally, the capture manager 120 may be configured to use any content recognition or content item recognition technique(s) suitable for a type of content being recognized.

For example, as referenced above, the capture manager 120 may be configured to use various machine learning or artificial intelligence techniques to capture, interpret, or otherwise utilize the content 108. For example, when the content 108 includes images, the capture manager 120 may be configured to recognize image elements as individual content items. For example, the capture manager 120 may perform image recognition using a suitable trained machine learning model (e.g., a convolutional neural network, or CNN).

The capture manager 120 may further be configured to facilitate and implement framing of the content 108, in order to ensure that desired aspects of the content 108 are captured and utilized in a desired manner. That is, the capture manager 120 may assist in setting the framing boundaries of the framed content 110a, 110b, 110c, to ensure, in the simplified example of FIG. 1, that the various content items '1, 2, 3, 4' are entirely and consistently included in captured images.

The capture manager 120 may interact with a user to assist in obtaining desired and suitable framing. For example, to assist a BLV user, the capture manager 120 may provide audible instructions, such as instructions to move to the left or right, or to move nearer or farther from the content 108. Similarly, the capture manager 120 may provide framing instructions in a native language of a user who is attempting to interact with content in a different language.

Although illustrated as a rectangle in FIG. 1, a size, shape, and other aspects of the framing boundaries may be configured in any desired or suitable manner. For example, framing may be executed in part based on expected or actual dimensions of the content 108.

Image storage 122 represents one or more types of memory used to store images captured by the capture manager 120. For example, a captured image such as the first image 112a may be used to perform OCR. In other examples, a camera of the HMD I/O hardware 104 may capture video of the content 108, and the image storage 122 may represent a buffer storing individual frames of the captured video.

A coordinate mapper 124 may be configured to map coordinates between multiple images, e.g., multiple image frames, and thereby relate, e.g., a location of the pointer image 111a in the second image 112b, to a corresponding location in the first image 112a, at which the content item '4' is located. In other words, by determining that the pointer image 111a and the content item '4' are both located at corresponding locations within the second image 112b and the first image 112a, the coordinate mapper 124 enables identification of content item(s) that are occluded by the pointer 111 in the framed content 110b.

Consequently, an output generator 126 is provided with an ability to provide various forms of output related to the occluded content item, and notwithstanding its current occlusion. For example, as referenced above, the output generator 126 may be configured to provide an audible reading of the occluded content item '4', using the previously-determined OCR output of the capture manager 120 and associated TTS functionality.

As also referenced above, and as described in more detail, below, the output generator 126 may provide many other types of output. For example, in addition to simply reading out occluded content items, the output generator 126 may provide related instructions, such as instructions for how to use a button or other interface element on which the occluded content item is printed.

The output generator 126 may also directly provide a function associated with the occluded content item. For example, when an occluded content item is text that is also a website link, the output generator 126 may provide access to the linked website. Similarly, when the occluded content item includes a phone number, the output generator 126 may cause a smartphone connected to the HMD 102 to dial the phone number. When the content 108 includes an image, and the occluded content item is an image portion or image element, the output generator 126 may provide a written or audible description of such an image portion or element.

As referenced, FIG. 1 represents a simplified example that is provided for the sake of illustration, explanation, and example, and the description of FIG. 1 herein, or the description of any of FIGS. 1-8, is not intended to be limiting or exhaustive. For example, although the above description describes examples with image capture and associated OCR that occur with respect to the content 108*a* at a first time that is prior to occlusion by the pointer 111 of the content 108*b* at a second time, it may also occur that OCR operations occur following a time of removal of the pointer 111.

More generally, the time series of the content 108*a*, 108*b*, 108*c* of the content 108 is not limited to the order shown, and may include additional points in time (and associated content images captured), before, during, or after the particular points in time illustrated in FIG. 1. When multiple individual frames of captured video are stored in a buffer, the capture manager 120 may store a number of unoccluded frames in the buffer, and the output generator 126 may select a best-available frame to use in recognizing or reading a currently occluded or selected content item. For example, such a selection may be made in response to a command/request from the user, or automatically in response to an external trigger (e.g., after the user's finger pauses for a pre-determined time, such as one second).

Figure 2:
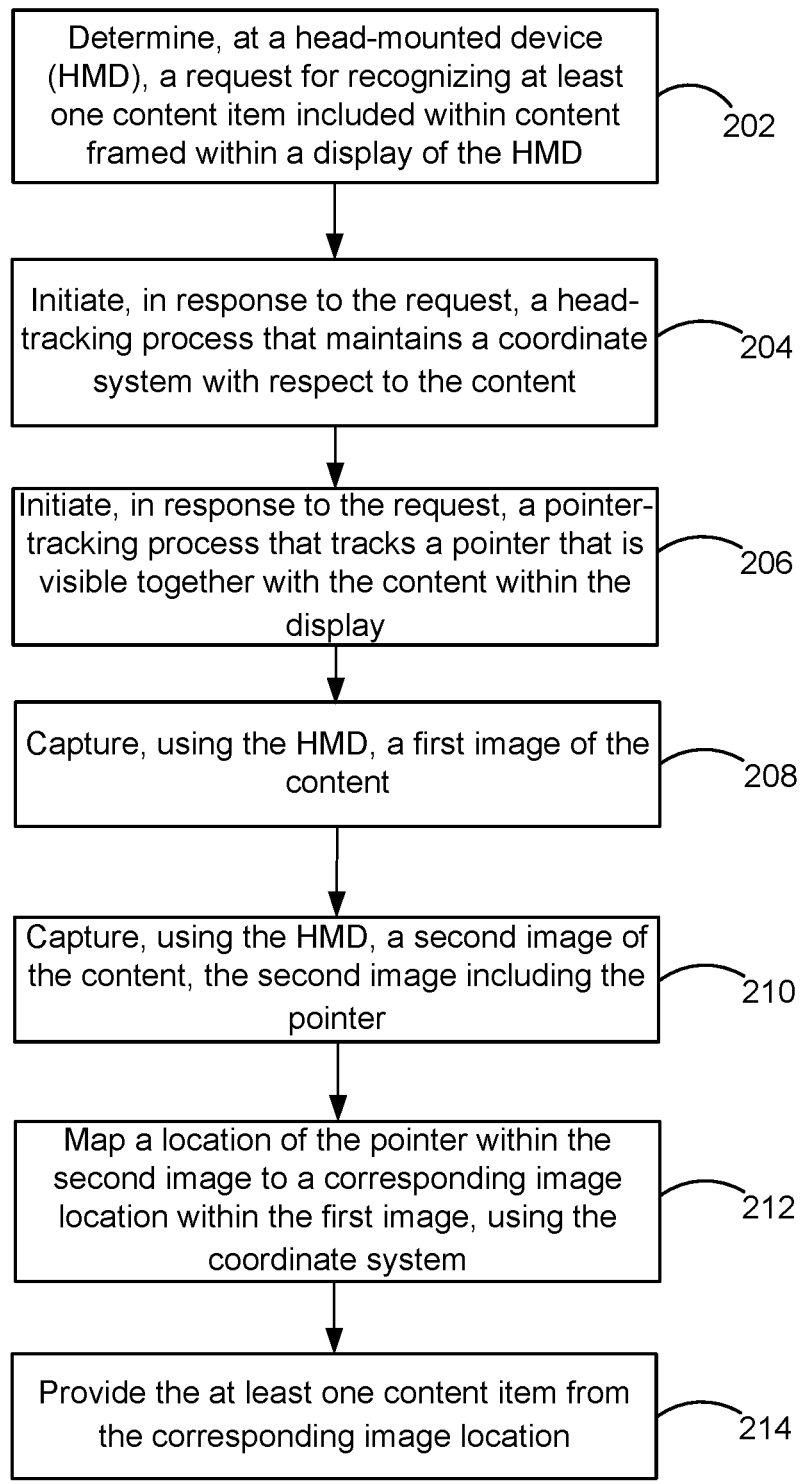
FIG. 2 is a flowchart illustrating example operations of the system of FIG. 1.

FIG. 2 is a flowchart illustrating example operations of the system of FIG. 1. In the example of FIG. 2, operations 202-212 are illustrated as separate, sequential operations. However, in various example implementations, the operations 202-212 may be implemented in an overlapping or parallel manner, and/or in a nested, iterative, looped, or branched fashion. Further, various operations or sub-operations may be included, omitted, or substituted.

In FIG. 2, at a HMD, a request for recognizing at least one content item included within content framed within a display of the HMD may be determined (202). For example, in FIG. 1, a user of the HMD 102 may request a reading or other output of the content 108, where the type of output depends in part of the content type of the content 108. That is, as explained above, content may include text, images, graphs, or other types of content, so that included content items may include words, image elements, graph elements, or other corresponding types of content items.

The request may be received as an explicit request from the user. For example, the user may access suitable input components of the HMD I/O hardware 104. For example, the user may utilize a touchpad or button on the HMD 102. In other examples, the use may speak the request audibly, for detection by a microphone of the HMD II) hardware 104.

In still other examples, the request may be received by way of implicit inference by the pointer-based reader 106. For example, the pointer-based reader 106 may interpret that a request has been received in response to a defined type of framing of, or pointing to, the content 108. For example, the request may be inferred when a pre-defined type of content (e.g., text) is framed for more than a defined time threshold (e.g., 1 second), and/or when the user points to specific content items for more than a defined time threshold. For example, the capture manager 120 may be configured to interpret these and other types of requests.

In response to the request, a head-tracking process that maintains a coordinate system with respect to the content may be initiated (204). For example, the head tracker 116 may implement a head-tracking process that tracks movements of the user's head, on the assumption that the HMD 102 moves together with the user's head (and body), relative to the content 108. In various implementations, any suitable type of 2D or 3D tracking may be used.

In example implementations, the head tracker 116 may utilize template tracking to perform the head-tracking process. In template tracking, an original portion or frame of the visible content is captured to be used as a template. Then even as the HMD 102 and its camera move, subsequent captures of the visible content may be related back to the image template. For example, subsequent images or frames may be searched to identify the image template (or portions thereof) contained therein.

In response to the request, a pointer-tracking process may be initiated that tracks a pointer that is visible together with the content within the display (206). As referenced above, the pointer may include a finger of the user of the HMD 102, or of another user, or may include a pointing instrument held by a user. The HMD 102 may use the HMD hardware 104 (e.g., camera) and the capture manager 120 to capture an image with the pointer 111 included, and to recognize the pointer 111.

As described herein, the head-tracking process and the pointer-tracking process may be configured to be executed together, in an overlapping or parallel fashion. For example, both tracking processes may be active at a same or overlapping time(s).

Using the HMD, a first image of the content may be captured (208). For example, the HMD 102 may capture the first image 112*a*. As described herein, image capture of the first image 112*a* may occur before, during, or after commencement of the head-tracking process and/or the pointer-tracking process. The image capture of the first image 112*a* may include OCR of the visible content or other processing of the visible content.

Using the HMD, a second image of the content may be captured, the second image including the pointer (210). For example, the HMD 102 may capture the second image 112*b*, including the pointer image 111*a*. As described, the pointer 111 may partially or completely occlude one or more content items of the visible content.

A location of the pointer within the second image may be mapped to a corresponding image location within the first image, using the coordinate system (212). For example, the coordinate mapper 124 of FIG. 1 may perform collision detection of a location of the pointer image 111*a* in the second image 112*b* with a corresponding location within the first image 112*a*, which would map to a location of the content item "4" within the first image 112*a*. In this way, the content item "4" may be identified as being pointed to, even when partially or completely occluded by the pointer 111.

Thus, the at least one content item may be provided from the corresponding image location (214). For example, the at least one content item "4" may be audibly read out, using TTS techniques and/or using previous OCR operations performed in conjunction with the capture of the first image 112*a*.

As referenced, many different implementations may be used to provide the at least one content item. For example, the at least one content item may include alphanumeric symbols associated with a function, such as placing a telephone call or opening a website, and the providing of the at least one content item may include providing the function.

In other examples, there may be two or more pointers within the second image 112b, and corresponding content items may be provided for both. For example, when the visible content includes a computer keyboard, a first pointer (e.g., finger) may point to a letter key, while a second pointer may point to a shift key, so that a combination of the letter key and shift key may be detected and a corresponding capital letter may be selected.

In other implementations, for example, multiple fingers (at least two fingers) may be used to identify specific words or other content, such as by identifying a word between two fingers in a pinch gesture, or identifying a word(s) between two fingers being spread apart. That is, when the pointer 111 includes at least two fingers, the pointer tracker 118 may be configured to track the at least two fingers, and the coordinate mapper 124 may be configured to map a location defined with respect to the at least two fingers, including a location between two fingers as the two fingers are spread apart, or pinched together.

As described, the head-tracking process and the pointer-tracking process may happen simultaneously, in parallel, or in an overlapping fashion, e.g., may be active at a same time(s). Therefore, for example, coordinates of the pointer 111 may be maintained with respect to the visible content 108 (and individual content items thereof) throughout multiple readings or other outputs of content items, and without requiring recalibration or unwanted, redundant readings of content items.

For example, using the system of FIG. 1, it is not necessary for a user to pause their finger while identifying content for reading. Instead, the user may move their finger from one location to another within the framed, tracked text, and the text pointed to may be immediately read out at a high level of granularity. Even if the pointer 111 moves out of frame and returns, reading of identified text may continue.

FIG. 3A illustrates an example HMD display according to example embodiments. In FIG. 3A, the HMD display shows a microwave control panel 300. Included visible content 302 therefore includes various individual content items related to providing the functionality of the microwave control panel 300.

For example, a section 304 includes individual numerals on corresponding buttons for, e.g., setting a timer for a timed cooking function of the microwave. A section 306 includes content items on corresponding buttons for general operational functions of the microwave, such as buttons for starting/pausing/canceling cooking operations, operating a clock or light, or setting a power level. A section 308 includes content items on corresponding buttons for more specific cooking operations, such as specialty functions for defrosting, reheating, cooking popcorn, heating a beverage, or performing a custom cooking operation. The microwave control panel 300 also includes a clock 310.

Thus, it will be appreciated that the microwave control panel 300 includes conventional content and individual content items, selected merely to provide an example of operations of the system of FIG. 1. Many other types of microwave control panels, and many other types of control panels and interfaces in general, may be used, including ATMs, computer keyboards, televisions, washer/dryers, and any household or industrial appliance.

In the example of FIG. 3A, each section and included content items have superimposed content items provided within the HMD display, and described and illustrated above with respect to superimposed content item 114. For example, the content items in the section 304 have superimposed content items 304a, the content items in the section 306 have superimposed content items 306a, the content items in the section 308 have superimposed content items 308a, and the clock 310 has superimposed clock 310a.

Further in FIG. 3A, a user's hand 312 is illustrated as being included, and as occluding a number of the various content items. In particular, an index finger 314 of the hand 312 is illustrated as pointing to, and occluding, a content item 316 having corresponding superimposed content item 316a displayed within the section 308.

FIG. 3A, and the above discussion thereof, provide example results of operations of the pointer-based reader 106 of FIG. 1, including the head tracker 116, the pointer tracker 118, the capture manager 120, and the coordinate mapper 124. For example, as described with respect to FIGS. 1 and 2, and in more detailed examples below with respect to FIGS. 3B and 4-6, the various superimposed content items 304a, 306a, 308a, 310a, 316a, as well as 319a discussed below, may be obtained using OCR results obtained by the capture manager 120 from a captured image of the microwave control panel 300.

These OCR results are overlaid in the desired, illustrated positions, using the head-tracker 116. In FIG. 3A, the OCR results (including superimposed content items) are overlaid adjacent to, but not overlapping with, corresponding content items. In other implementations, OCR results may be displayed in any suitable or desired positions, including in overlapping positions with corresponding content items. As also shown in FIG. 3A, the superimposed content items may be displayed in desired positions, even when their corresponding content items are fully occluded by the user's hand 312 or finger 314 (e.g., may be shown superimposed on the hand 312 or finger 314).

In specific examples referenced herein, template tracking may be performed as an example implementation of head-tracking. For example, as referenced, the head-tracker 116 may obtain an initial template from a frame segment of a frame or image captured by the capture manager 120, and may then attempt to match that template to subsequent image frames.

Thus, when performing head tracking in the example of FIG. 3A, the head tracker 116 may perform template tracking, including outputting four points of a quadrilateral that are computed to match corresponding points within an initial frame. Then, the four points from the current frame of FIG. 3A, and from the initial frame, may be used to compute a homography transform between the two images/frames.

As the pointer tracker 118 is currently performing finger tracking of the finger 314, the resulting homography transform may be used by the coordinate mapper 124 to transform a current finger position into a coordinate space of the original captured image, which thus corresponds with the coordinates contained in the OCR results. Accordingly, collision detection is enabled between the finger 314 and any text in the OCR results.

In other words, for example, the homography transform may input a tracked finger position in conjunction with an initial detection box and a current detection box. The homography transform may then provide a finger position having coordinates that correspond to OCR results, e.g., a finger position in a text space.

Accordingly, in FIG. 3A, a box 317 illustrates results of finger tracking by the pointer tracker 118. A box 318 represents a transformed finger tracking box, or finger position in text space, using the homography transform described above. As shown, the box 318 correctly intersects with the content item 316 ("potato"), which the finger 314 is on top of (occluding).

As a result of the pointing action, the HMD 102 may audibly read out the content item 316 (i.e., "potato") in addition to displaying the superimposed content item 316a. In this way, the user may receive instructions and assistance in identifying and selecting the underlying microwave button for providing a functionality associated with the content item 316 (e.g., cooking a potato in the microwave).

Figure 3B:
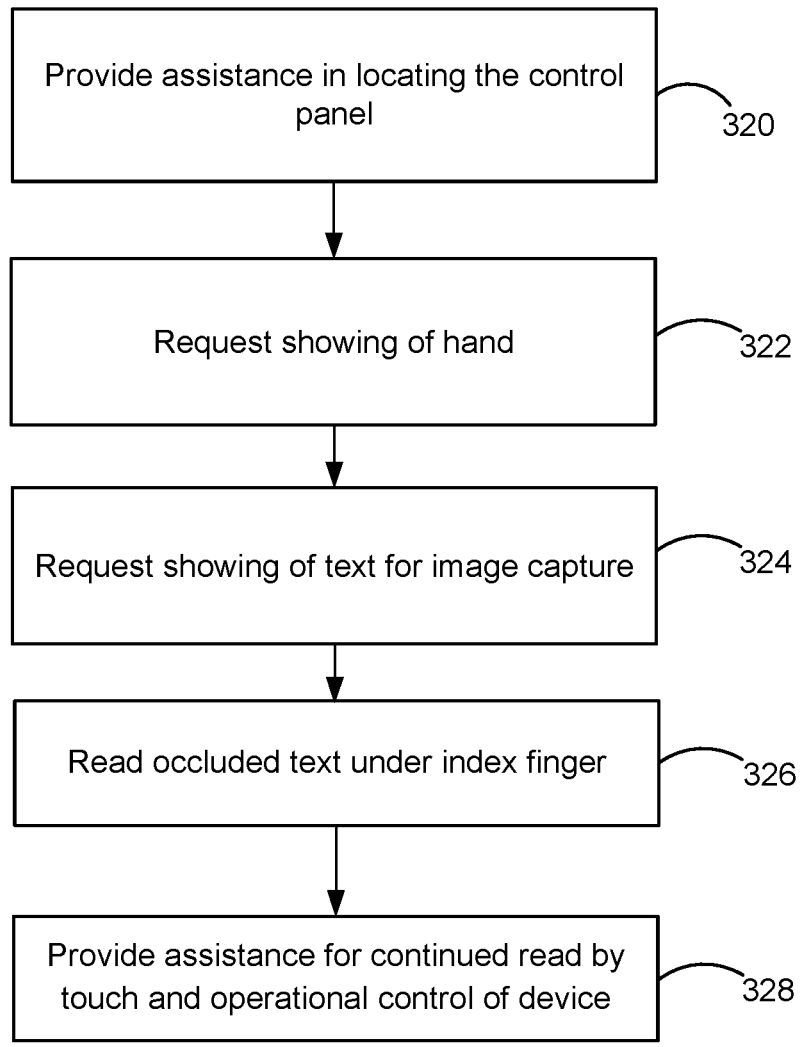
FIG. 3B is a flowchart illustrating example operations of the example of FIG. 3A.

In the related example operational flow of FIG. 3B, the HMD 102 may provide assistance in helping a user frame the microwave control panel 300, and in implementing desired functionalities of the microwave control panel 300. For example, in FIG. 3B, the HMD 102 may initially provide assistance in locating the microwave control panel 300 (320).

For example, the HMD 102 may provide audible instructions such as, "to start, find the control panel of your appliance; when ready, tap touchpad to continue," with reference to a touchpad or other input of the HMD I/O hardware 104. A user may find the control panel by sight, or, in the case of a BLV user, by touch.

The HMD 102 may then request a showing of the user's hand 312 within the framed control panel (322). For example, the HMD 102 may provide audible instructions such as, "hold up your hand with your arm extended," "place your hand on the control panel," and/or "look at your hand." The HMD 102 may then provide audible indication of the hand being detected.

The HMD 102 may then request a showing of the text for image capture (324). For example, the HMD 102 may provide audible instructions such as, "move your hand away for a few seconds," and then, following image capture, may provide an audible indication thereof.

The HMD 102 may then provide an audible reading of specific text occluded by the detected index finger 314 (326). For example, the HMD 102 may provide audible instructions such as, "place your hand back onto the control panel to hear the text under your index finger read."

As described above with respect to FIGS. 1 and 2, the HMD 102 may then proceed to provide assistance for continued read by touch operations and associated operational control of the device (e.g., microwave oven) (328). For example, the HMD 102 may have received a request from the user for cooking a potato. The HMD 102 may instruct the user to move their hand in an indicated direction (e.g., up, down, left, right) until the index finger occludes the content item 316, "potato." Then the HMD 102 may provide an instruction to press the underlying button of the microwave control panel 300.

Continuing, the HMD 102 may provide further direction to assist in finding the start button under content item 319 within the section 306, and associated with superimposed content item 319a. Again, the HMD 102 may provide instruction to press the underlying button once the index finger 314 is detected as occluding the content item 319.

Thus, the example techniques of FIG. 3B may be used to assist a BLV user in operating functionalities of the microwave control panel 300. For a sighted user, the HMD 102 may provide similar assistance as well, such as when a cooking operation requires multiple steps that are unknown to the user. Then, the HMD 102 may provide step-by-step instructions for obtaining the desired functionality. In related implementations, the HMD 102 may provide visual directional elements, such as arrows or highlighted superimposed content items, to assist a user in locating a desired content item or associated button/functionality.

In other examples, the user may be provided with an ability to read the microwave control panel 300 in a native language of the user. For example, the various content items of the content 302 may be provided in a first language, but the various superimposed content items (e.g., 304a, 306a, 308a, 310a, 319a) may be provided in a native or specified language of the user.

In FIG. 3A, the various superimposed content items 304a, 306a, 308a, 310a, 319a are provided proximate to their corresponding content items 304, 306, 308, 310, 319. In other implementations, superimposed content items may be provided separately, e.g., may be provided together in another display, or display portion.

FIG. 3B provides example operations related to a user experience of using the HMD 102 to interact with the microwave control panel 300. Not explicitly discussed with respect to FIG. 3B, but understood from the above discussions of FIGS. 1 and 2, are related operations of the HMD 102 in providing the described head-tracking process and pointer-tracking process, as well as the associated OCR process, which enable the functionalities described with respect to FIG. 3B.

Figure 4:
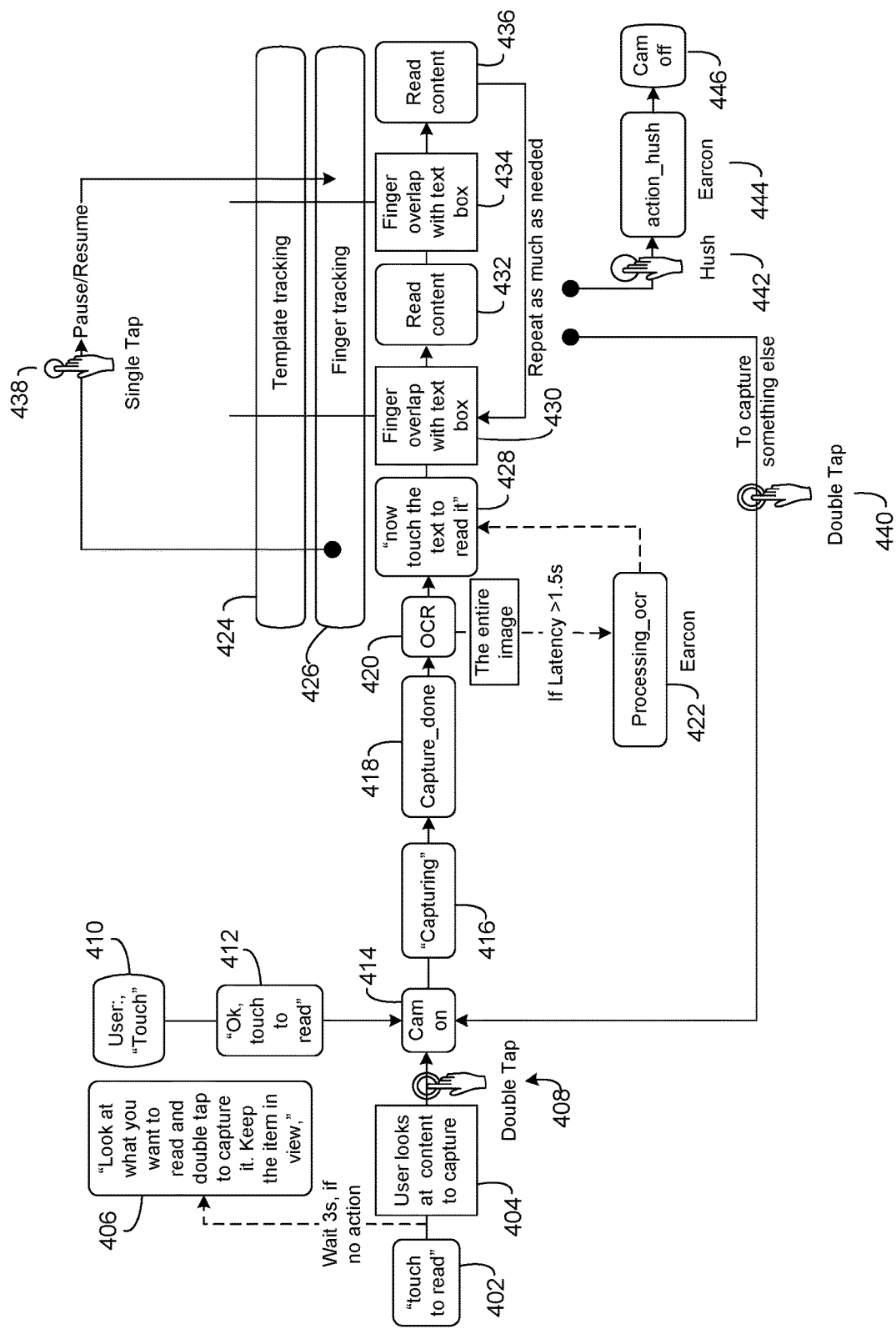
FIG. 4 illustrates a process flow according to example embodiments.

For example, FIG. 4 illustrates the head-tracking process, pointer-tracking process, and OCR process, and related example operations, which may be used to provide, for example, the user experiences described above with respect to FIGS. 3A and 3B. As shown in FIG. 4, the HMD 102 may initially receive a command 402 to initiate a 'touch to read' process from a user. The user may proceed to look at the content to capture (404), or, if no user action is detected after a wait period (e.g., 3 seconds), then an audible instruction 406 may be provided, such as, "Look at what you want to read and double-tap to capture it. Keep the item in view." A double tap command 408, or other suitable command, may then be received to initiate a camera on action 414.

Alternatively, the user may provide an initial command 410 to initiate the process. Then, the HMD 102 may acknowledge the command 410, e.g., audibly, by outputting "Ok, touch to read." The camera on action 414 may then be implemented.

The HMD 102 may output an audible notification 416 that capturing of the content is occurring, or is about to occur. Then, a notification 418 may be provided that the capture process is complete.

An OCR process 420 of the captured content may then proceed. If a latency threshold is exceeded, a notification 422 may be provided to alert the user that the OCR process is proceeding.

In the example of FIG. 4, overlapping with the OCR process 420, both a template tracking process 424 and a finger tracking process 426 are initiated, as examples of the head-tracking process and pointer-tracking process, respectively, of FIG. 1. As shown, the tracking processes 424, 426 may proceed in parallel with one another.

Within a time following the OCR process 420 and during both the tracking processes 424, 426, the HMD 102 may provide a notification 428, such as an audible notification, to touch the captured text to initiate a desired reading thereof.

Then, following a detection 430 of a finger overlap with a text box identified from the OCR process 420 and identifying a content item, the HMD 102 may provide an output 432 to read or otherwise provide the pointed-to content item. As referenced above, and illustrated explicitly in FIG. 4, the user may continue to move their finger to different content items within the content as long as the tracking processes 424, 426 continue, as shown by a subsequent detection 434 of a second finger overlap with another text box identified from the OCR process 420 and identifying another content item, and the HMD 102 then providing an output 436 to read or otherwise provide the pointed-to second content item. As also shown in FIG. 4, at any time during a touch-to-read window of time following completion of the OCR process 420 and occurrence of the tracking processes 424, 426, a user may pause the operations with a single tap 438 or other suitable command.

As may be further observed from FIG. 4, only the single OCR process 420 is needed to obtain the multiple (as many as needed or desired) readings of different content items within the content. However, as shown by the double tap command 440, the user may easily initiate a second or subsequent image capture of the same or different content.

Otherwise, at any time, a hush command 442 or other stop action may provide a corresponding notification 444. Then, a camera off action 446 may coincide with completion of the tracking processes 424, 426 and of the touch-to-read functionality, as shown.

Described techniques are highly efficient and low latency. For example, the finger tracking process 426 may be conducted using a relatively lower resolution and frame-per-second capture mode than the OCR capture process, which may utilize a higher resolution to ensure accurate OCR results. Meanwhile, frames used in the template tracking process 424 may use frames that have been downscaled, to improve tracking latency.

Figure 5:
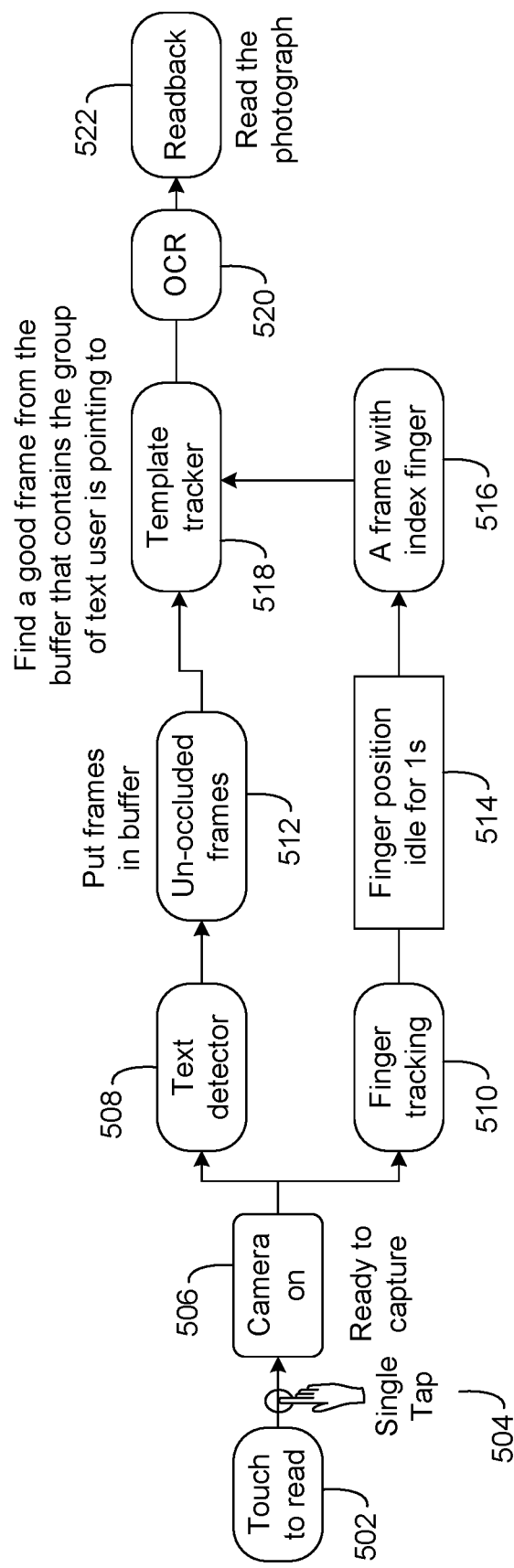
FIG. 5 illustrates an alternative process flow according to example embodiments.

FIG. 5 illustrates an alternative process flow according to example embodiments. In FIG. 5, in contrast to FIG. 4, an OCR process begins after template and finger tracking processes, rather than before.

In FIG. 5, following a command 502 to initiate a touch-to-read process, such as a single tap operation 504, a camera on operation 506 may turn on a camera of the HMD hardware 104 and put the HMD 102 into a ready-to-capture state.

As further illustrated, a text detector 508 may be configured to detect text within a view of the HMD 102, while a finger tracking process 510 is conducted in parallel. As shown, un-occluded frames 512 (e.g., without a finger included) may be stored in a buffer. Then, in respond to detection 514 of an idle finger position for a pre-determined time (e.g., 1 second), then both the captured un-occluded frames 512 and a frame 516 with an included finger may both be provided to a template tracker 518.

The template tracker 518 may be configured to select a high-quality frame from the un-occluded frames 512, e.g., a frame that contains the relevant text and is best-suited for an OCR process 520. Thus, the OCR process 520 may be conducted using the high quality frame, and the OCR process 520 is performed after a location in the captured text for which reading is desired is known. Accordingly, a readback operation 522 of the pointed-to text may be executed.

Figure 6:
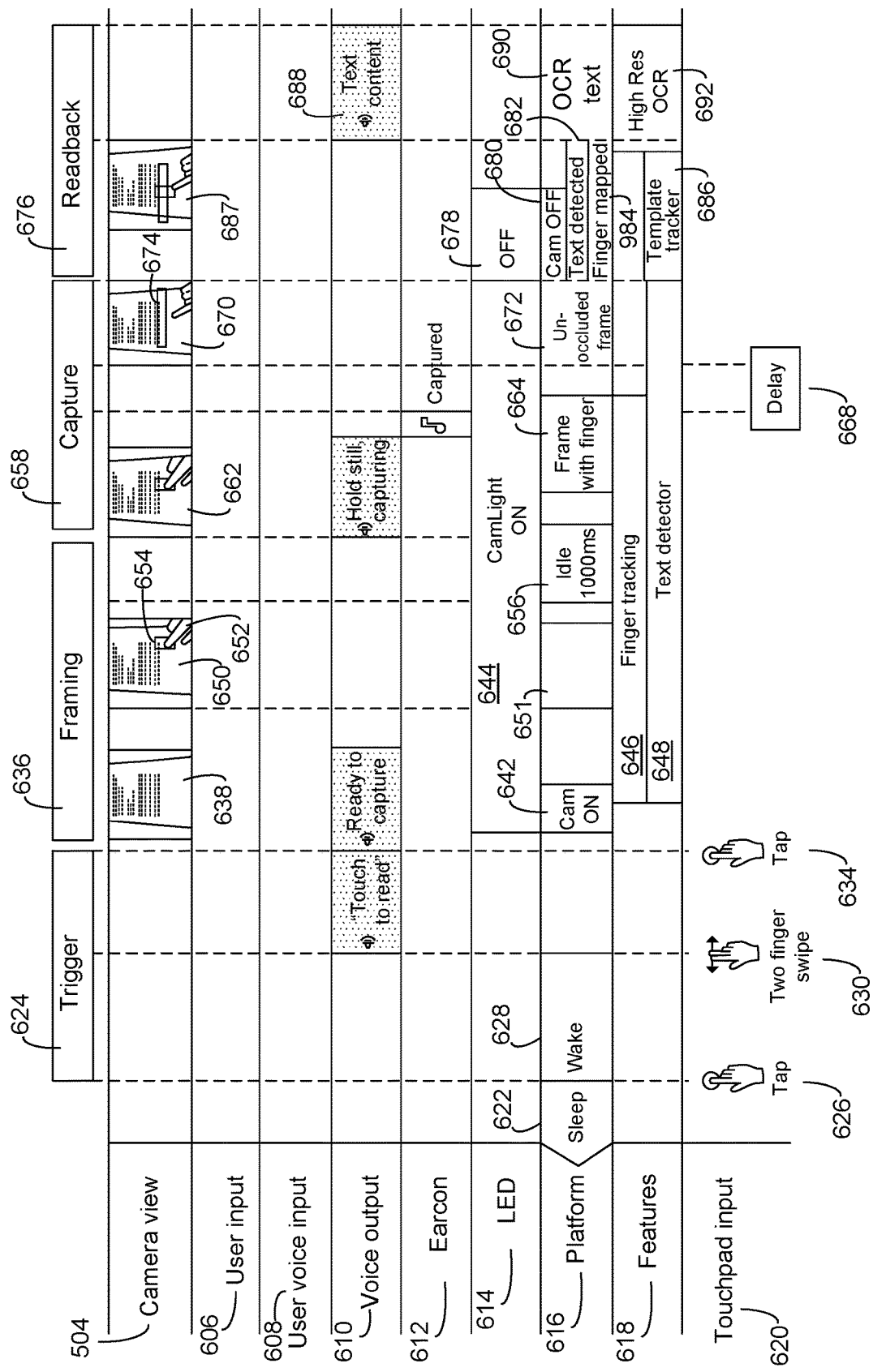
FIG. 6 is a timing diagram illustrating example operations of the system of FIG. 1.

FIG. 6 is a timing diagram illustrating example operations of the system of FIG. 1. In FIG. 6, various HMD aspects 602 include a camera view 604, user input 606, user voice input 608, voice output 610, earcon 612, LED indicator 614, platform 616, features 618 of the pointer-based reader 106 of FIG. 1, and touchpad input 620.

In FIG. 6, following a sleep phase 622, a trigger phase 624 may be initiated by a tap operation 626 or other suitable wake operation. In the trigger phase 624, a wake period 628 is followed by a two-finger swipe operation 630 or other suitable selection operation, causing a voice output 632 of 'touch to read,' thereby indicating to the user that desired content should be framed (e.g., using techniques described above, or other suitable framing techniques).

Accordingly, a tap operation 634 or other initiation command initiates a framing phase 636. During framing, content 638 is viewed using the HMD 102 and a voice output 640 of 'ready to capture' is generated.

The platform 616 performs an operation 642 to turn on an included camera, and the LED 614 is turned on as part of an operation 644. As shown, the camera light ON operation 644 continues as finger tracking 646 and text detection 648 commence.

Subsequently, in a frame 650, the platform 616 is able to perform a find finger operation 651 to identify or find a finger 652 of the user within the frame 650. A text box 654 may then be displayed to indicate an area in which reading will occur in response to the presence of the finger 652.

If the platform 616 detects an idle period 656 (e.g., 1 second) during which the finger 652 is still, then a capture phase 658 may be triggered. In the capture phase 658, the voice output 610 may provide an audible indication 660 that image capturing is occurring. Specifically, an occluded frame 662 is captured by the platform 616 as frame 664, at which point the earcon 612 provides an audible indication 666 that capture is complete.

If desired, a delay period 668 may be provided, during which, for example, the user may move their hand or finger to provide an un-occluded frame 670. As may be observed and appreciated, un-occluded in this sense means merely that the previously-occluded text (e.g., in the text box 654) is now un-occluded, and does not require full removal of the finger 652 from the captured frame 670. Accordingly, the platform 616 may complete the capture of the un-occluded frame 672, including at least an un-occluded portion 674.

At this point in time, a readback phase 676 may commence. As shown, the LED 614 may be turned OFF 678, and in conjunction therewith, the platform 616 may perform an operation 680 to turn off the camera, as well.

Text detection 682 and finger mapping 684 may then be performed, using operations of the template tracker 686. Accordingly, text at previously-occluded location 687 may be identified. The platform 616 may perform an OCR operation 690 of the text, e.g., at the mapped location 687, perhaps using a high-resolution OCR process 692, and the voice output 610 may then provide an audible readout 688 of the recognized text.

As described above, in subsequent operations, additional touch-to-read operations may be conducted. For example, the camera of the platform 616 and the LED 614 may be reactivated, along with additional finger tracking. In this context, additional text detection and recognition may or may not be necessary, if previously detected/recognized text is still available.

Figure 7:
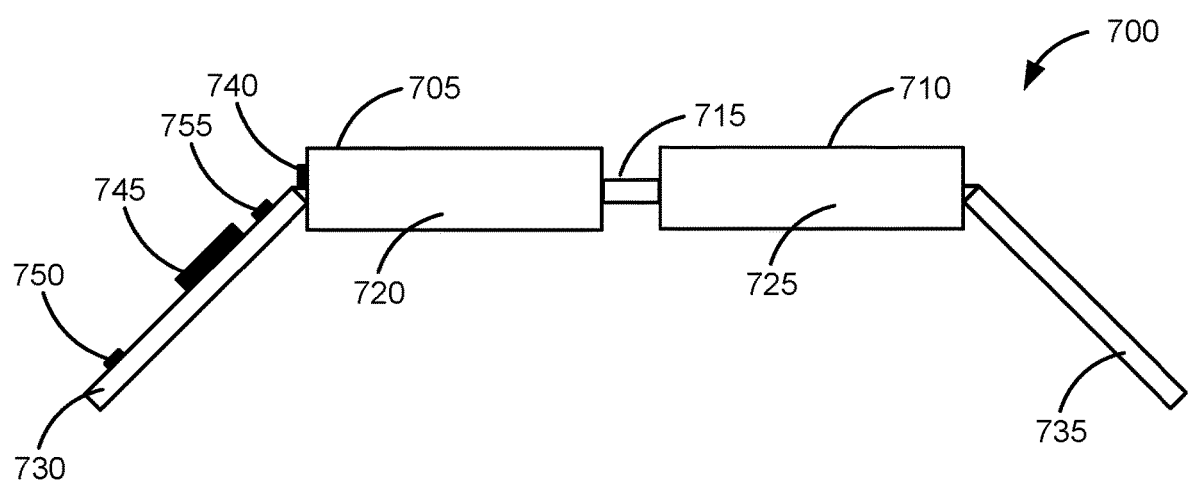
FIG. 7 illustrates an example pair of wearable glasses that may be used with the system of FIG. 1.

FIG. 7 illustrates an example pair of wearable glasses 700 that may be used with the system of FIG. 1. Wearable glasses 700 may include lens frame 705, lens frame 710, center frame support 715, lens element 720, lens element 725, extending side-arm 730, extending side-arm 735, image capture device 740 (e.g., a camera), on-board computing system 745 (which may include, or utilize, a touch input feature, such as a touchpad), speaker 750, and microphone 755.

Each of the frame elements 705, 710, and 715 and the extending side-arms 730, 735 can be formed of a solid structure of plastic and/or metal, or can be formed of a hollow structure of similar material so as to allow wiring and component interconnects to be internally routed through the wearable glasses 700. Other materials can be possible as well. At least one of the lens elements 720, 725 can be formed of any material that can suitably display a projected image or graphic. Each of the lens elements 720, 725 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 715 and the extending side-arms 730, 735 are configured to secure the wearable glasses 700 to a user's face via a user's nose and ears, respectively. The extending side-arms 730, 735 can each be projections that extend away from the lens-frames 705, 710, respectively, and can be positioned behind a user's ears to secure the wearable glasses 700 to the user. The extending side-arms 730, 735 can further secure the wearable glasses 700 to the user by extending around a rear portion of the user's head. Additionally, or alternatively, for example, the wearable glasses 700 can connect to or be affixed within a head-mounted helmet structure. Other configurations for wearable glasses are also possible.

The on-board computing system 745 is shown to be positioned on the extending side-arm 730 of the wearable glasses 700; however, the on-board computing system 745 can be provided on other parts of the wearable glasses 700 or can be remotely positioned from the wearable glasses 700 (e.g., the on-board computing system 745 could be wire- or wirelessly-connected to the wearable glasses 700). The on-board computing system 745 can include a processor and memory, for example. The on-board computing system 745 can be configured to receive and analyze data from the image capture device 740 (and possibly from other sensory devices) and generate images for output by the lens elements 720, 725.

The image capture device 740 can be, for example, a camera that is configured to capture still images and/or to capture video. In the illustrated configuration, image capture device 740 is positioned on the extending side-arm 730 of the wearable glasses 700; however, the image capture device 740 can be provided on other parts of the wearable glasses 700. The image capture device 740 can be configured to capture images at various resolutions or at different frame rates. Many image capture devices with a small form-factor, such as the cameras used in mobile phones or webcams, for example, can be incorporated into an example of the wearable glasses 700.

One image capture device 740 is illustrated. However, more image capture devices can be used, and each can be configured to capture the same view, or to capture different views. For example, the image capture device 740 can be forward facing to capture at least a portion of the real-world view perceived by the user. This forward-facing image captured by the image capture device 740 can then be used to generate an augmented reality where computer generated images appear to interact with or overlay the real-world view perceived by the user.

Wearable glasses 700 can be used to (e.g., the on-board computing system 745) interpret certain gestures (e.g., by a wearer's hand or hands) as user input. For example, wearable glasses 700 can capture hand gestures by analyzing image data from image capture device 740, and initiate tasks that are defined as corresponding to certain gestures. Further, speaker 750 and microphone 755 can be used as input/output components. For example, the microphone 755 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

In some implementations, the wearable glasses 700 can determine a user's intent, such as an intent to perform a touch to read operation, as described herein. In some implementations, it should be noted that the wearable glasses 700 may determine user's intent based on a combination of hand gestures and verbal commands from a digital assistant.

Figure 8:
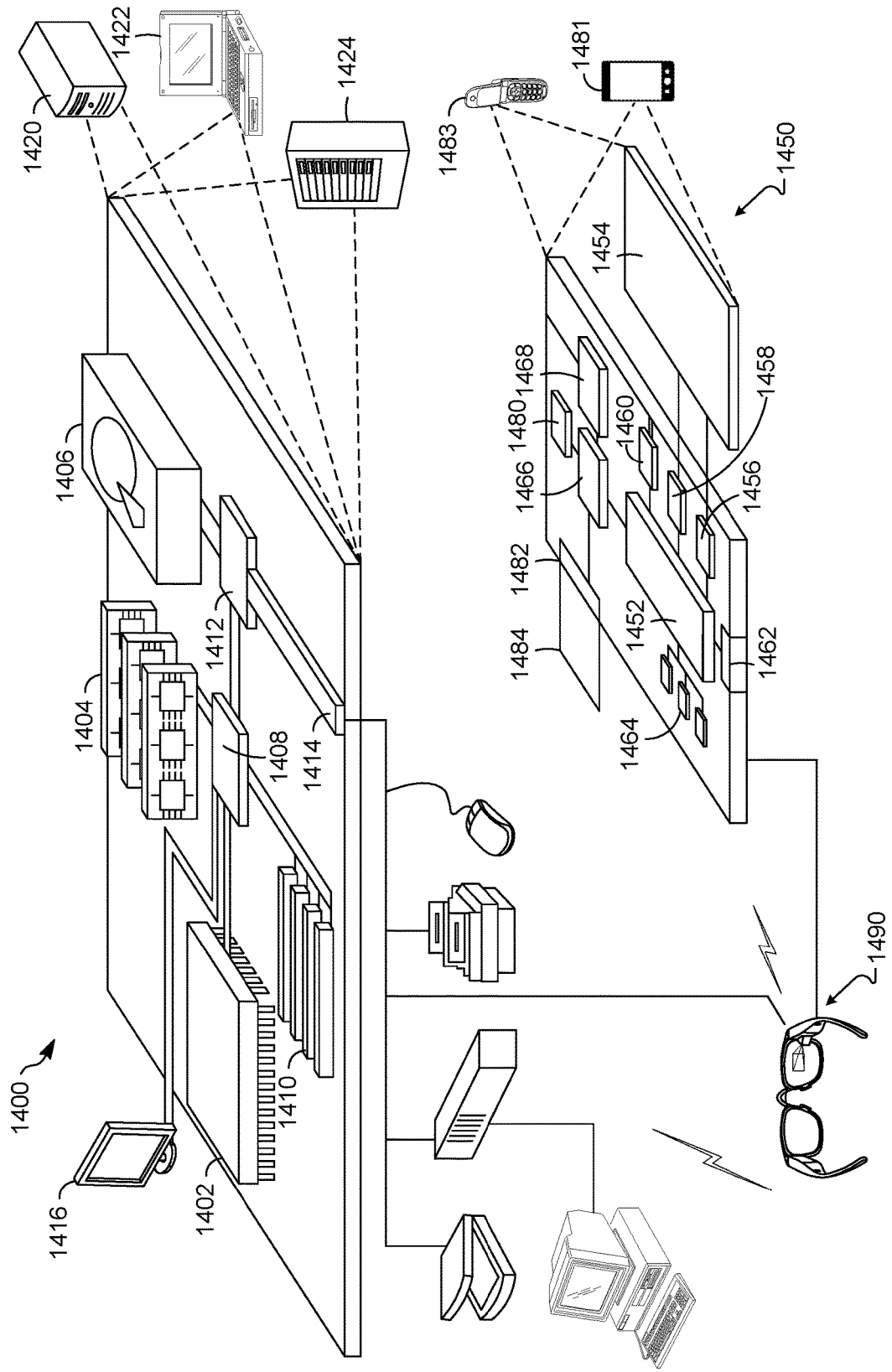
FIG. 8 shows an example of a computer device, mobile computer device and head mounted device according to at least one example implementation.

FIG. 8 shows an example of a computer device 1400 and a mobile computer device 1450, which may be used with the techniques described here. Computing device 1400 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk. In general, the computer-readable medium may be a non-transitory computer-readable medium.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1484 may also be provided and connected to device 1450 through expansion interface 1482, which may include, for example, a SIMM (Single In Line Memory Module) card interface. Such expansion memory 1484 may provide extra storage space for device 1450, or may also store applications or other information for device 1450. Specifically, expansion memory 1484 may include instructions to carry out or supplement the processes described above, and may include secure information also. Thus, for example, expansion memory 1484 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1484, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, low power Bluetooth, Wi-Fi, or other such transceiver (not shown). In addition, GPS (Global Positioning System) receiver module 1480 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1483. It may also be implemented as part of a smart phone 1481, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 14 can include sensors that interface with, or are included in, a HMD 1490. For example, one or more sensors included on computing device 1450 or other computing device depicted in FIG. 14, can provide input to HMD 1490 or in general, provide input to that can be used by the HMD 1490. The sensors can include, but are not limited to, a touchscreen, accelerometers, gyroscopes, pressure sensors, biometric sensors, temperature sensors, humidity sensors, and ambient light sensors. Computing device 1450 (e.g., the HMD 1490) can use the sensors to determine an absolute position and/or a detected rotation of the HMD 1490 that can then be used as input for use by the HMD 1490.

In some implementations, one or more input devices included on, or connected to, the computing device 1450 and/or the HMD 1490 can be used as inputs for use by the HMD 1490. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device.

In some implementations, one or more output devices included on the computing device 1450, and/or in the HMD 1490, can provide output and/or feedback to a user of the HMD 1490. The output and feedback can be visual, tactical, or audio. The output and/or feedback can include, but is not limited to, rendering a display of the HMD 1490, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 1450 can be placed within HMD 1490 to create an integrated HMD system. HMD 1490 can include one or more positioning elements that allow for the placement of computing device 1450, such as smart phone 1481, in the appropriate position within HMD 1490. In such implementations, the display of smart phone 1481 can render images using a display of the HMD 1490.

In some implementations, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the AR/VR space. As just one example, computing device can be a laser pointer. In such an example, computing device 1450 appears as a virtual laser pointer in the computer-generated, 3D environment. As the user manipulates computing device 1450, the user in the AR/VR space sees movement of the laser pointer. The user receives feedback from interactions with the computing device 1450 in the AR/VR environment on the computing device 1450 or on the HMD 1490.

In some implementations, a computing device 1450 may include a touchscreen. For example, a user can interact with the touchscreen in a particular manner that can mimic what happens on the touchscreen with what happens in a display of the HMD 1490. For example, a user may use a pinching-type motion to zoom content displayed on the touchscreen. This pinching-type motion on the touchscreen can cause information provided in display to be zoomed. In another example, the computing device may be rendered as a virtual book in a computer-generated, 3D environment.

In some implementations, one or more input devices in addition to the computing device (e.g., a mouse, a keyboard) can be rendered in a display of the HMD 1490. The rendered input devices (e.g., the rendered mouse, the rendered keyboard) can be used as rendered in the in the display.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer program product, the computer program product being tangibly embodied on a non-transitory computer-readable storage medium and comprising instructions that, when executed by at least one computing device, are configured to cause the at least one computing device to:
   determine, at a head-mounted device (HMD), a request for recognizing at least one content item included within content framed within a display of the HMD;
   initiate, in response to the request, a head-tracking process that maintains a coordinate system with respect to the content;
   initiate, in response to the request, a pointer-tracking process that tracks a pointer that is visible together with the content within the display, the head-tracking process and the pointer-tracking process executing at least partially in parallel with one another;
   capture, using the HMD, a first image of the content;
   capture, using the HMD, a second image of the content while the head-tracking process and the pointer-tracking process are active, the second image including the pointer;
   map a location of the pointer within the second image to a corresponding image location within the first image, using the coordinate system; and
   provide the at least one content item from the corresponding image location while the head-tracking process and the pointer-tracking process are active.

2. The computer program product of claim 1, wherein the content includes text, and the at least one content item includes at least one word.

3. The computer program product of claim 1, wherein the instructions, when executed, are further configured to cause the at least one computing device to:
   execute the head-tracking process using template tracking, in which a template defined with respect to the first image is tracked with respect to a corresponding template in the second image, in conjunction with any movement of the HMD between capture of the first image and capture of the second image.

4. The computer program product of claim 3, wherein the instructions, when executed, are further configured to cause the at least one computing device to:
   map the location of the pointer within the second image to the corresponding image location within the first image, using a homography transform, the template defined with respect to the first image, and the corresponding template in the second image.

5. The computer program product of claim 1, wherein the instructions, when executed, are further configured to cause the at least one computing device to:
   provide the at least one content item using a content item recognition technique.

6. The computer program product of claim 5, wherein the content item recognition technique includes optical character recognition (OCR).

7. The computer program product of claim 5, wherein the content item recognition technique is performed on the first image.

8. The computer program product of claim 5, wherein the content item recognition technique occurs after the capture of the second image.

9. The computer program product of claim 5, wherein the content item recognition technique occurs after the capture of the first image and at least partially prior to initiation of the head-tracking process and the pointer-tracking process, and before the capture of the second image.

10. The computer program product of claim 1, wherein the pointer includes a finger.

11. The computer program product of claim 1, wherein the pointer at least partially occludes the at least one content item in the second image.

12. The computer program product of claim 1, wherein the instructions, when executed, are further configured to cause the at least one computing device to:
    provide the at least one content item including displaying a superimposed content item in proximity to the at least one content item within a display of the HMD.

13. The computer program product of claim 1, wherein the instructions, when executed, are further configured to cause the at least one computing device to:
    provide the at least one content item including providing an audible reading of the at least one content item.

14. A computer-implemented method, the method comprising:
    determining, at a head-mounted device (HMD), a request for recognizing at least one content item included within content framed within a display of the HMD;
    initiating, in response to the request, a head-tracking process that maintains a coordinate system with respect to the content;
    initiating, in response to the request, a pointer-tracking process that tracks a pointer that is visible together with the content within the display, the head-tracking process and the pointer-tracking process executing at least partially in parallel with one another;
    capturing, using the HMD, a first image of the content;
    capturing, using the HMD, a second image of the content while the head-tracking process and the pointer-tracking process are active, the second image including the pointer;
    mapping a location of the pointer within the second image to a corresponding image location within the first image, using the coordinate system; and
    providing the at least one content item from the corresponding image location while the head-tracking process and the pointer-tracking process are active.

15. The method of claim 14, wherein providing the at least one content item comprises:
    displaying a superimposed content item in proximity to the at least one content item within a display of the HMD.

16. The method of claim 14, wherein the pointer includes at least two fingers, and wherein the pointer tracking process tracks the pointer including tracking the at least two fingers, and the mapping the location of the pointer includes mapping the location defined with respect to the at least two fingers.

17. A head-mounted device (HMD) comprising:
    at least one memory including instructions; and
    at least one processor that is operably coupled to the at least one memory and that is arranged and configured to execute the instructions to cause the at least one processor to determine, at a head-mounted device (HMD), a request for recognizing at least one content item included within content framed within a display of the HMD;

initiate, in response to the request, a head-tracking process that maintains a coordinate system with respect to the content;

initiate, in response to the request, a pointer-tracking process that tracks a pointer that is visible together with the content within the display, the head-tracking process and the pointer-tracking process executing at least partially in parallel with one another;

capture, using the HMD, a first image of the content;

capture, using the HMD, a second image of the content while the head-tracking process and the pointer-tracking process are active, the second image including the pointer;

map a location of the pointer within the second image to a corresponding image location within the first image, using the coordinate system; and provide the at least one content item from the corresponding image location while the head-tracking process and the pointer-tracking process are active.

* * * * *